(12) United States Patent
Johnston

(10) Patent No.: US 6,502,900 B1
(45) Date of Patent: Jan. 7, 2003

(54) REMOVABLE AND VERTICALLY ADJUSTABLE STORAGE APPARATUS FOR VEHICLE SEAT BACKREST

(75) Inventor: Kent E. Johnston, Birmingham, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/965,941

(22) Filed: Sep. 27, 2001

(51) Int. Cl.⁷ .................................................. A47C 7/62
(52) U.S. Cl. ............. 297/188.06; 297/297; 297/188.05; 297/188.07; 297/188.4; 108/44; 312/235.2
(58) Field of Search ....................... 297/188.06, 188.05, 297/188.07, 188.4, 188.2, 188.21; 312/235.2, 235.5, 235.8; 108/47, 48, 44; 211/85.29, 103, 208, 119.007, 88.01

(56) References Cited

U.S. PATENT DOCUMENTS

| | | | |
|---|---|---|---|
| 2,711,213 A | * 6/1955 | Owens | 248/231.81 |
| 2,881,039 A | * 4/1959 | Guzman | 108/134 |
| 4,443,034 A | 4/1984 | Beggs | 296/65 |
| 5,009,042 A | * 4/1991 | Sacco et al. | 312/350 |
| 5,046,433 A | 9/1991 | Kramer et al. | 108/44 |
| 5,163,568 A | * 11/1992 | Laurendeau et al. | 211/187 |
| 5,269,229 A | 12/1993 | Akapatangkul | 108/44 |
| 5,370,060 A | 12/1994 | Wang | 108/44 |
| 5,443,018 A | * 8/1995 | Cromwell | 108/44 |
| 5,678,741 A | 10/1997 | Schieber | 224/275 |
| 5,813,354 A | 9/1998 | Scott | 108/44 |
| 5,921,605 A | 7/1999 | Musukula et al. | 296/63 |
| 5,931,527 A | 8/1999 | D'Onofrio et al. | 297/146 |
| 5,967,054 A | 10/1999 | Rosenfeld | 108/44 |
| 6,105,839 A | 8/2000 | Bell | 224/275 |
| 6,315,135 B1 | * 11/2001 | Stuart | 211/87.01 |

* cited by examiner

*Primary Examiner*—Peter M. Cuomo
*Assistant Examiner*—Erika Garrett
(74) *Attorney, Agent, or Firm*—Myers Bigel Sibley & Sajovec (57) ABSTRACT

Storage apparatus are provided that attach to vehicle seat backrests and that have a compartment for storing items therein. Each storage apparatus includes opposite upper and lower walls, opposite side walls, and a rear wall that collectively define a compartment. A door is pivotally mounted to the storage apparatus and is movable between a closed position for covering an opening and an open position for allowing access to the storage apparatus via the opening. Each storage apparatus can be removably secured to the elongated support members in multiple vertically spaced-apart positions. Two or more storage apparatus may be removably secured to a vehicle seat backrest in adjacent, vertically spaced-apart relationship.

16 Claims, 7 Drawing Sheets

REMOVABLE AND VERTICALLY ADJUSTABLE STORAGE APPARATUS FOR VEHICLE SEAT BACKREST

FIELD OF THE INVENTION

The present invention relates generally to vehicles and, more particularly, to cargo management apparatus for use within vehicles.

BACKGROUND OF THE INVENTION

In sport/utility and mini-van vehicles, generally there are two or more rows of seating. Conventionally, behind the last row of seating is a cargo storage area. Unfortunately, in automotive vehicles such as sport/utility vehicles and mini-vans, cargo storage space may be somewhat limited. Accordingly, a need exists to maximize the efficiency and utilization of existing cargo storage space without intruding on passenger space.

SUMMARY OF THE INVENTION

In view of the above discussion, a storage apparatus is provided that attaches to a vehicle seat backrest and that has a compartment for storing items therein. According to embodiments of the present invention a storage apparatus includes opposite upper and lower walls, opposite side walls, and a rear wall that collectively define a compartment for receiving items for storage therewithin. A door is pivotally mounted to the storage apparatus and is movable between a closed position for covering an opening and an open position for allowing access to the storage apparatus via the opening. The elongated storage apparatus is secured to the rear portion of a vehicle seat backrest via a pair of elongated support members. Each elongated support member includes a hanger that is configured to removably attach the respective support member to one or more headrest support posts of a respective headrest. The elongated support members include connectors that are configured to removably interconnect with corresponding connectors on the rear wall of the elongated storage apparatus. The elongated storage apparatus can be removably secured to the elongated support members in multiple vertically spaced-apart positions.

According to embodiments of the present invention, two or more storage apparatus may be removably secured to the elongated support members in adjacent, vertically spaced-apart relationship.

Apparatus according to embodiments of the present invention may be lightweight and are designed for quick and easy installation and removal. Moreover, apparatus according to embodiments of the present invention can be interchangeably installed within various different vehicles. Apparatus according to embodiments of the present invention can be inexpensive to manufacture and do not require special brackets and/or attachments, and do not require vehicle modifications.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
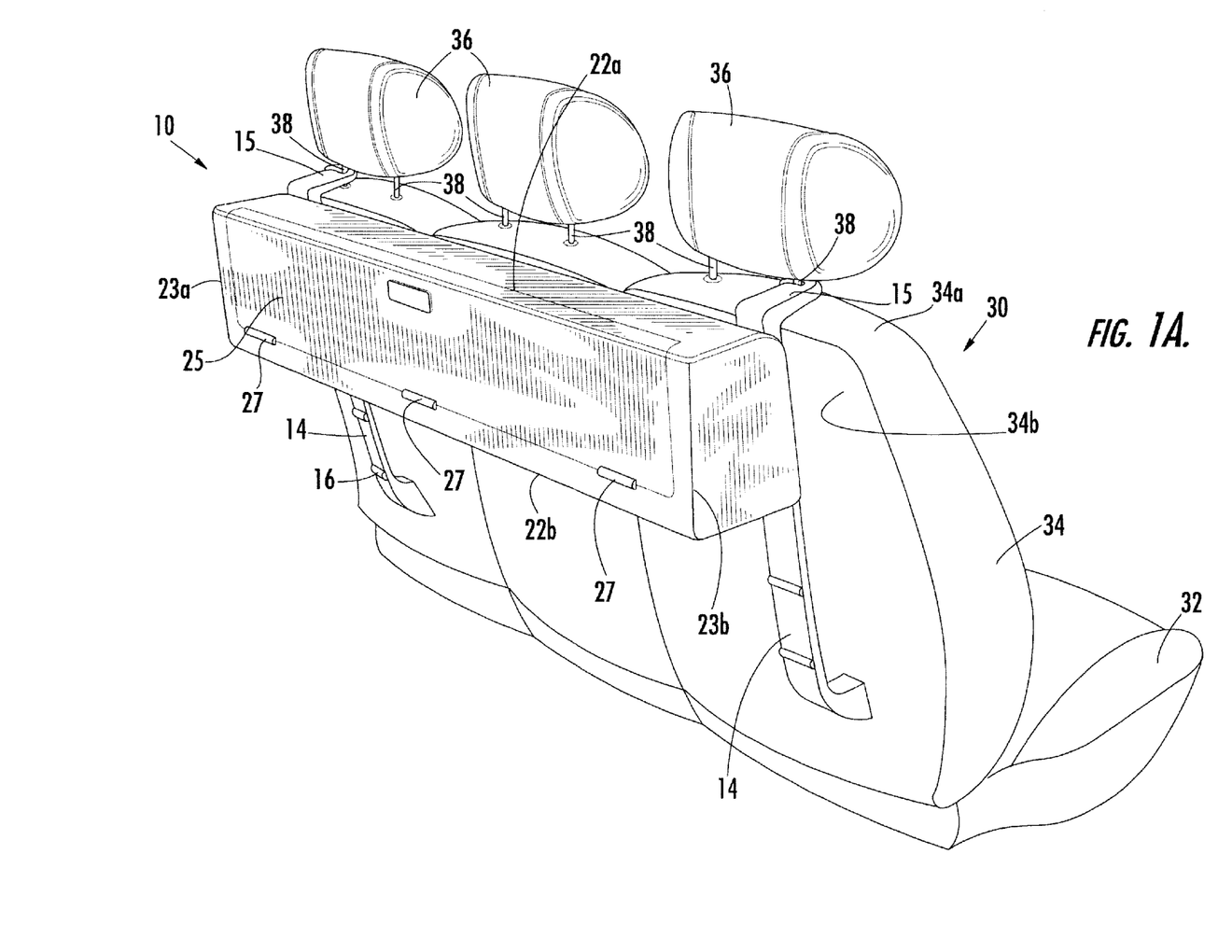
FIGS. 1A–1C are perspective views of a storage apparatus removably attached to a vehicle seat backrest in different vertical positions, according to embodiments of the present invention.
Figure 1B:
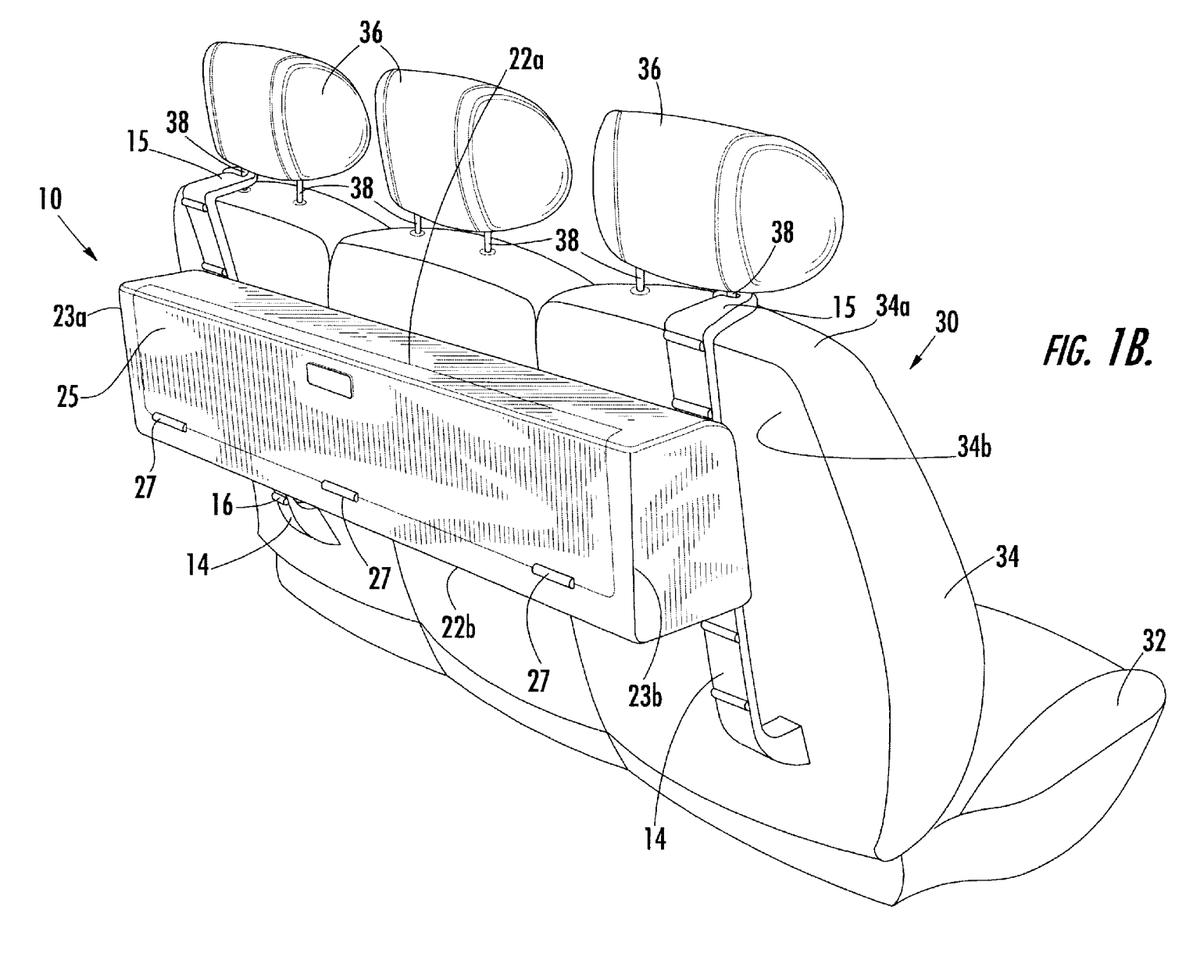
Figure 1C:
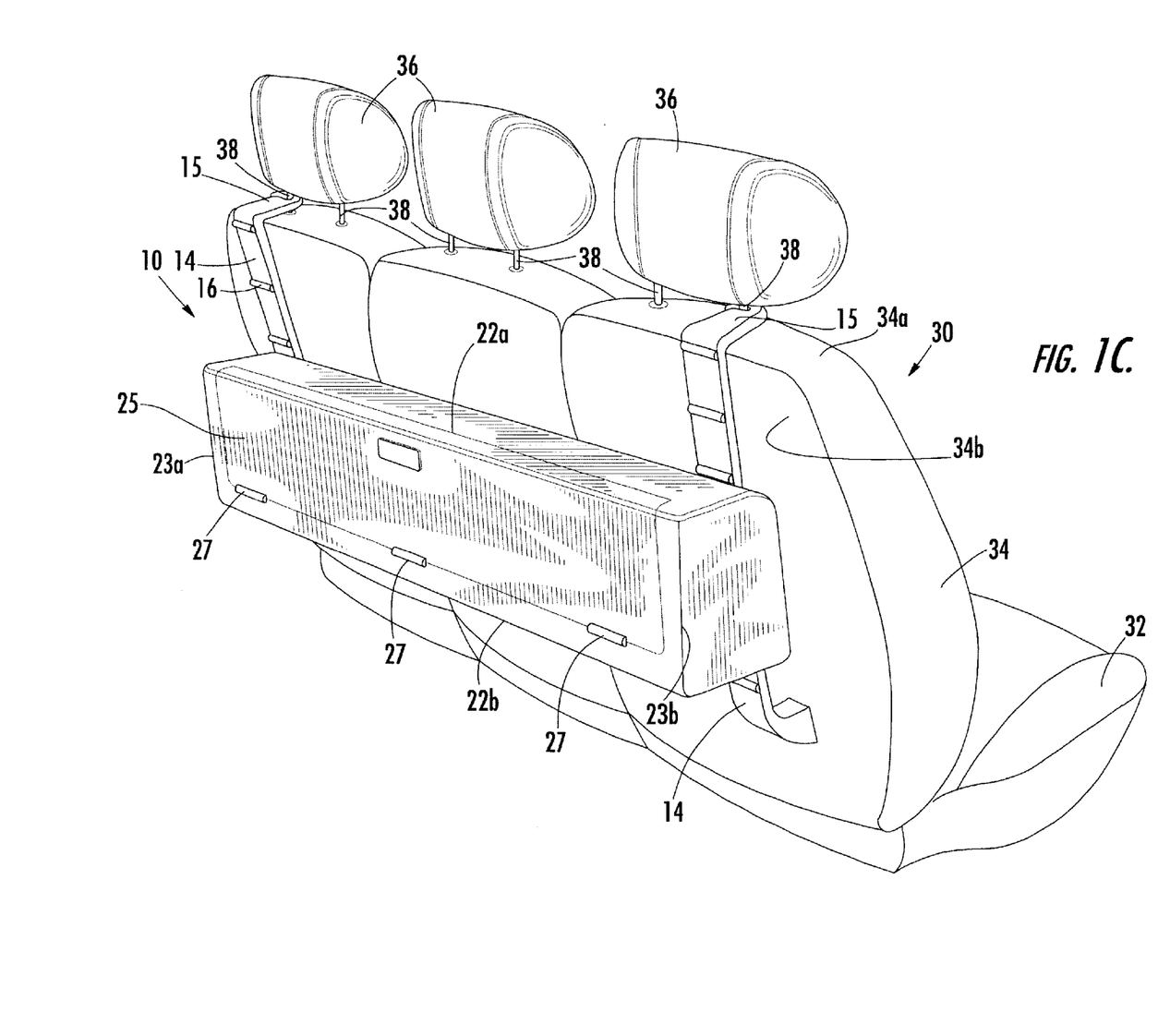
Figure 4:
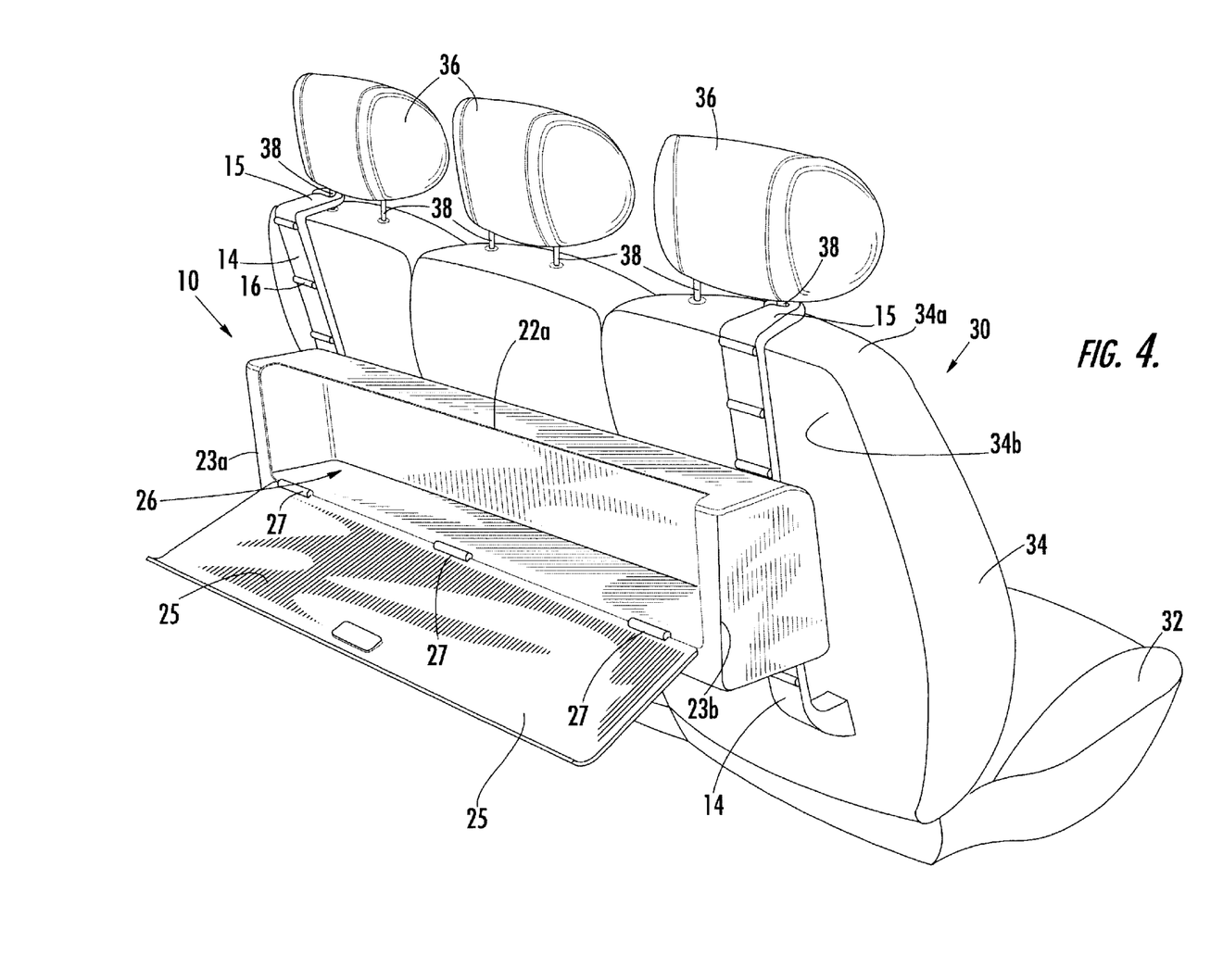
FIG. 4 is a perspective view of the storage apparatus of FIG. 1 with the door in an open position to allow access to the storage compartment.

Referring initially to FIGS. 1A–1C, an elongated storage apparatus 10 according to embodiments of the present invention is removably attached to a vehicle seat 30. The illustrated storage apparatus 10 includes opposite upper and lower walls 22a, 22b, opposite side walls 23a, 23b, and a rear wall 24 that collectively define a compartment for receiving items for storage therewithin. The illustrated storage apparatus 10 also includes a door 25 that is pivotally mounted to the storage apparatus 10 via hinges 27, and that is movable between a closed position for covering the opening 26 in the storage apparatus 10 and an open position (FIG. 4) for allowing access to the compartment via the opening 26. The illustrated upper and lower walls 22a, 22b, side walls, 23a, 23b, and rear wall 24 have generally rectangular configurations. However, embodiments of the present invention are not limited to the illustrated configurations of these walls. Each of these walls may have various shapes, sizes and/or configurations, without limitation. The door 25 may be pivotally mounted via any number of hinges and/or via hinges of various sizes, shapes, and/or configurations without limitation.

The illustrated vehicle seat 30 includes a seat portion 32 and a backrest 34 attached to the seat portion 32. The illustrated backrest 34 includes a top portion 34a and a rear portion 34b. A plurality of headrests 36 are connected to the top portion 34a of the backrest 34 via respective support posts 38. Vehicle seats and headrests attached thereto are well understood by those skilled in the art, and will not be described further herein. Storage apparatus according to embodiments of the present invention may be utilized with any type of seat for use within any type of vehicle.

The elongated storage apparatus 10 is secured to the rear portion 34b of the backrest 34 via a pair of elongated support members 14 that are removably secured to the rear portion 34b of the backrest 34 in spaced-apart relationship. Although illustrated in generally parallel spaced-apart relationship, the elongated support members 14 need not be generally parallel. Moreover, the elongated support members 14 may have various shapes, sizes, and/or configurations, the selection of which will be within the skill of one in the art, and are not limited to the illustrated embodiment.

Each elongated support member 14 comprises a hanger 15 that is configured to removably attach the respective support member 14 to one or more headrest support posts 38 of a respective headrest 36. Headrest support post hangers 15 according to embodiments of the present invention may have various configurations and shapes, without limitation. In addition, each support member 14 may be attached at another location thereof to a portion of a backrest 34 and/or seat portion 32 of a vehicle seat 30.

Figure 2A:
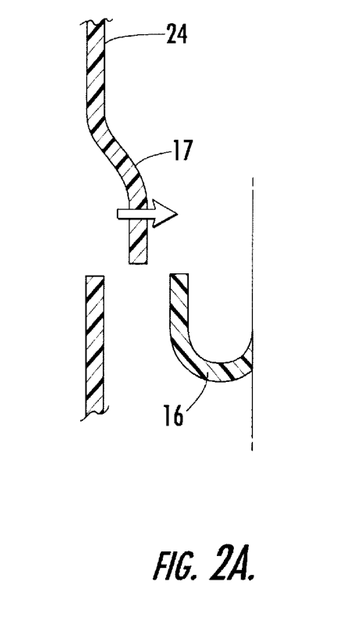
FIGS. 2A–2C are enlarged partial views of male and female connectors for removably attaching the storage apparatus of FIGS. 1A–1C to a vehicle seat backrest according to embodiments of the present invention.
Figures 2B, 2C:
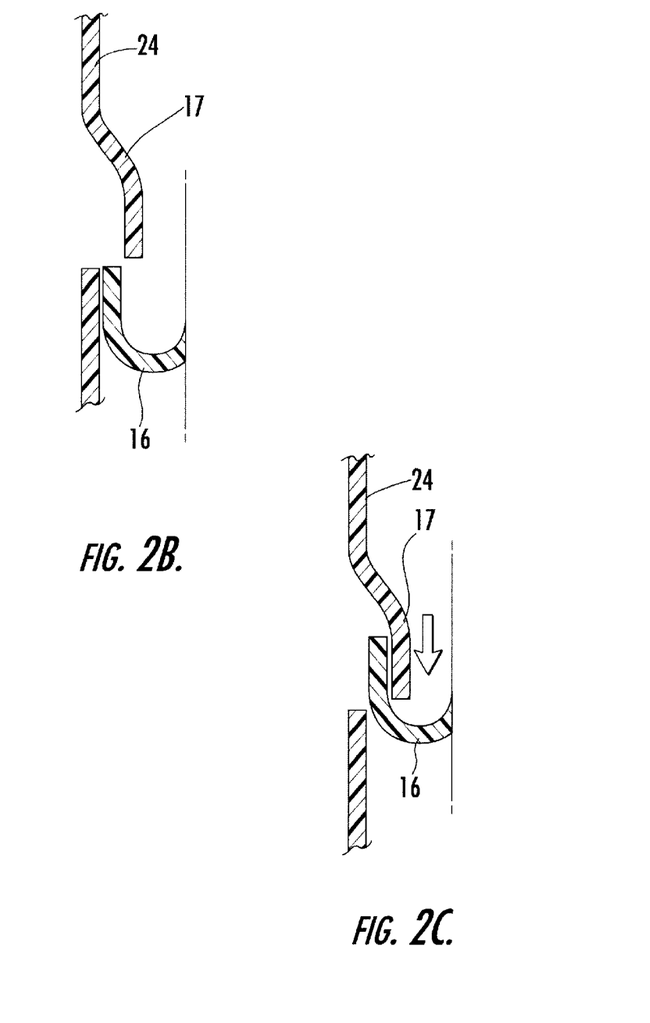
Figure 3A:
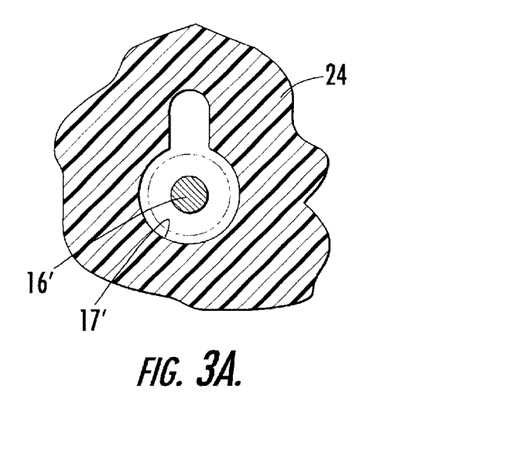
FIGS. 3A–3F are enlarged partial views of male and female connectors for removably attaching the storage apparatus of FIGS. 1A–1C to a vehicle seat backrest according to embodiments of the present invention.
Figure 3B:
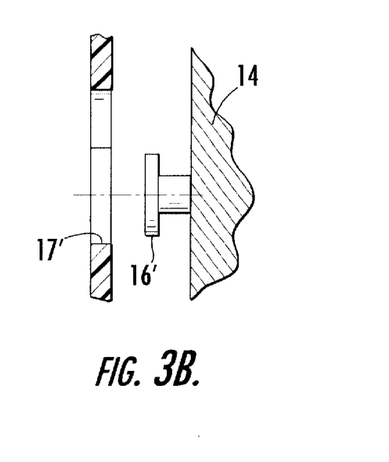
Figure 3C:
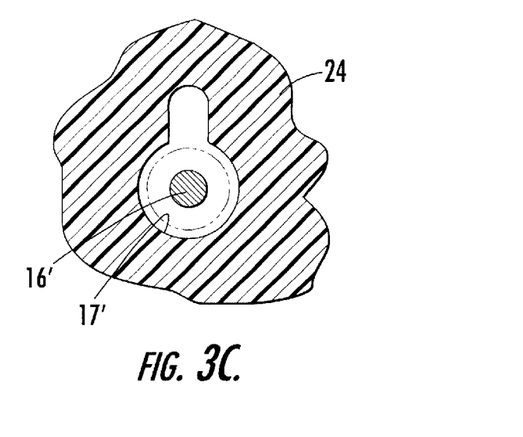
Figure 3D:
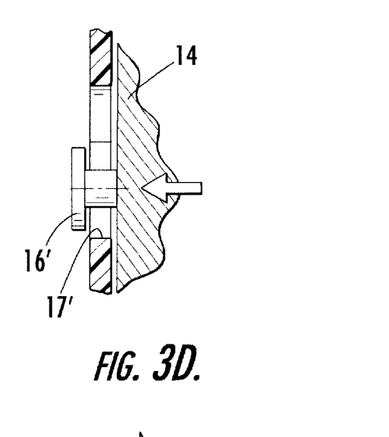
Figure 3E:
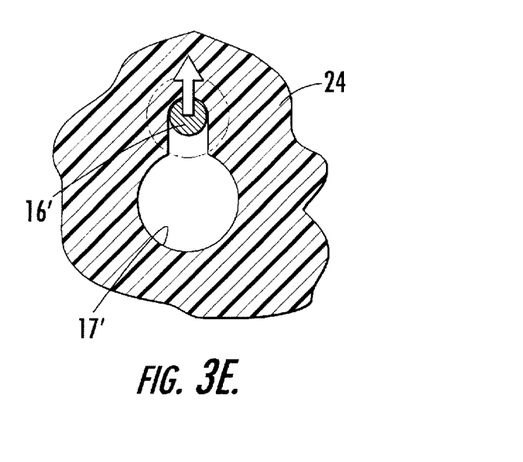
Figure 3F:
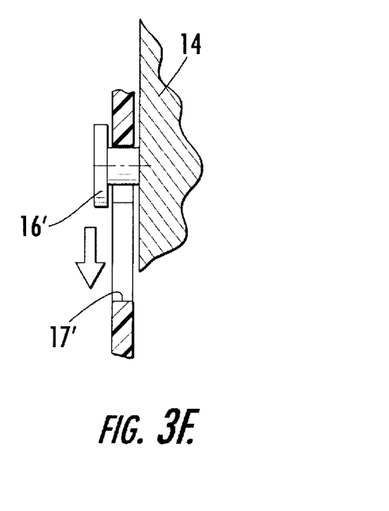

The illustrated elongated support members 14 include male connectors 16 extending outwardly therefrom that are configured to engage corresponding female connectors 17 on the rear wall 24 of the elongated storage apparatus 10, as illustrated in greater detail in FIGS. 2A–2C. FIGS. 3A–3F illustrate another embodiment for attaching one or more storage apparatus 10 to the elongated support members 14. Male connectors 16' extend outwardly from the elongated support members 14 have a rounded configuration, as illustrated, that are configured to engage corresponding "keyhole-shaped" female connectors 17' on the rear wall 24 of an elongated storage apparatus 10.

However, the storage apparatus 10 can be removably secured to the elongated support members 14 in various ways and utilizing connectors of various shapes, sizes, and/or configurations, without limitation. For example, the rear wall 24 of the elongated storage apparatus 10 may include male connectors that are configured to removably interconnect with female connectors on the elongated support members 14. According to other embodiments of the present invention, one or more storage apparatus 10 may be permanently mounted to the elongated support members 14.

As illustrated in FIGS. 1A–1C, the elongated storage apparatus 10 can be removably secured to the elongated support members 14 in multiple vertically spaced-apart positions. For example, the elongated storage apparatus 10 may be removably secured to the elongated support members 14 in an upper position relative to the backrest 34 (FIG. 1A), a middle position relative to the backrest 34 (FIG. 1B), and a lower position relative to the backrest 34.

Figure 5:
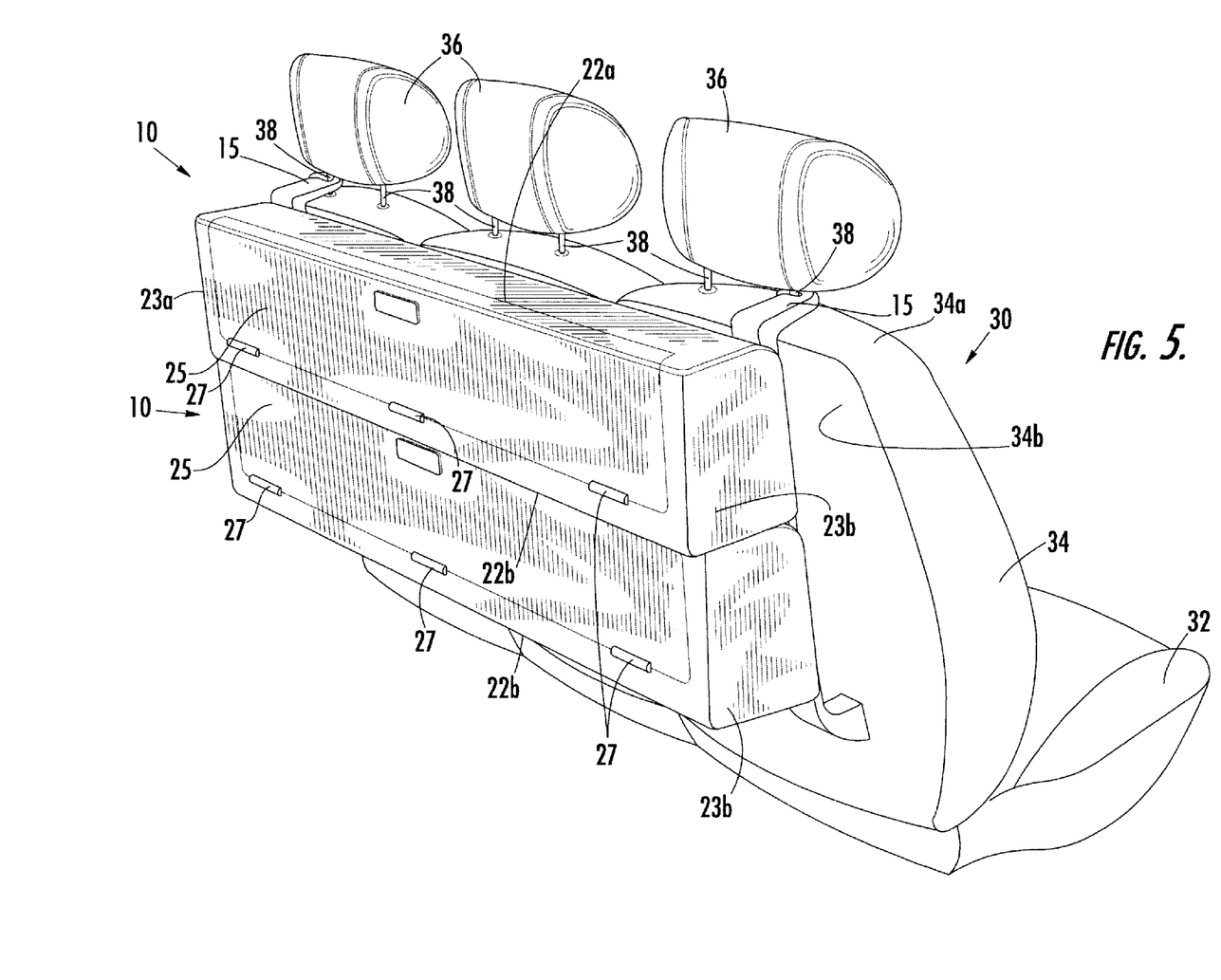
FIG. 5 is a perspective view of two storage apparatus emovably attached to a vehicle seat backrest in vertically spaced-apart relationship according to embodiments of the present invention.

According to embodiments of the present invention, two or more storage apparatus 10 may be removably secured to the elongated support members in adjacent, vertically spaced-apart relationship as illustrated in FIG. 5. In addition, one or more storage apparatus 10 may be used in conjunction with other storage devices and features disclosed in co-owned U.S. patent application Ser. Nos. 09/938,034 and 09/966,705, the disclosures of which are incorporated herein by reference in their entireties.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A storage apparatus that attaches to a vehicle seat backrest, the storage apparatus comprising:
   a pair of elongated support members adapted to be removably secured to a rear portion of the backrest in spaced-apart relationship, wherein each elongated support member comprises a plurality of vertically spaced-apart connectors; and
   an elongated storage compartment comprising a door pivotally mounted thereto for movement between a closed position for covering an opening in the storage compartment and an open position for allowing access to the storage compartment via the opening, wherein the storage compartment comprises a pair of connectors, each of which is adapted to removably engage any of the plurality of vertically spaced-apart connectors on a respective one of the elongated support members such that the storage compartment can be removably secured to the elongated support members in two or more vertically spaced-apart positions.

2. The storage apparatus of claim 1, wherein the elongated storage compartment comprises:
   opposite upper and lower walls having a generally rectangular configuration;
   opposite side walls having a generally rectangular configuration; and
   a rear wall having a generally rectangular configuration, and wherein the storage compartment is removably secured to the elongated support members via the rear wall.

3. The storage apparatus of claim 1, wherein the backrest includes a top portion and one or more headrests connected to the top portion via one or more respective support posts, and wherein each elongated support member comprises a hanger adapted to removably attach the support member to the one or more headrest support posts of a respective headrest.

4. The storage apparatus of claim 1, wherein the pair of elongated support members are adapted to be removably secured to a rear portion of the backrest in spaced-apart, generally parallel relationship.

5. A storage apparatus that attaches to a vehicle seat backrest, the storage apparatus comprising:
   a pair of elongated support members adapted to be removably secured to a rear portion of the backrest in spaced-apart relationship; and
   first and second elongated storage compartments adapted to be removably secured to the elongated support members in adjacent, vertically spaced-apart relationship;
   wherein each elongated storage compartment comprises a door pivotally mounted thereto for movement between a closed position for covering an opening in the respective storage compartment and an open position for allowing access to the respective storage compartment via the opening.

6. The storage apparatus of claim 5, wherein each elongated storage compartment comprises:
   opposite upper and lower walls having a generally rectangular configuration;
   opposite side walls having a generally rectangular configuration; and
   a rear wall having a generally rectangular configuration, and wherein each storage compartment is removably secured to the elongated support members via a respective rear wall.

7. The storage apparatus of claim 5, wherein the backrest includes a top portion and one or more headrests connected to the top portion via one or more respective support posts, and wherein each elongated support member comprises a hanger adapted to removably attach the support member to the one or more headrest support posts of a respective headrest.

8. The storage apparatus of claim 5, wherein the pair of elongated support members are adapted to be removably secured to a rear portion of the backrest in spaced-apart, generally parallel relationship.

9. A vehicle seat, comprising:

a seat portion;

a backrest attached to the seat portion; and a storage apparatus attached to a rear portion of the backrest, comprising:

a pair of elongated support members adapted to be removably secured to a rear portion of the backrest in spaced-apart relationship, wherein each elongated support member comprises a plurality of vertically spaced-apart connectors; and an elongated storage compartment comprising a door pivotally mounted thereto for movement between a closed position for covering an opening in the storage compartment and an open position for allowing access to the storage compartment via the opening, wherein the storage compartment comprises a pair of connectors, each of which is adapted to removably engage any of the plurality of vertically spaced-apart connectors on a respective one of the elongated support members such that the storage compartment can be removably secured to the elongated support members in two or more vertically spaced-apart positions.

10. The vehicle seat of claim 9, wherein the elongated storage compartment comprises:

opposite upper and lower walls having a generally rectangular configuration;

opposite side walls having a generally rectangular configuration; and a rear wall having a generally rectangular configuration, and wherein the storage compartment is removably secured to the elongated support members via the rear wall.

11. The vehicle seat of claim 9, wherein the backrest includes a top portion and one or more headrests connected to the top portion via one or more respective support posts, and wherein each elongated support member comprises a hanger adapted to removably attach the support member to the one or more headrest support posts of a respective headrest.

12. The vehicle seat of claim 9, wherein the pair of elongated support members are adapted to be removably secured to a rear portion of the backrest in spaced-apart, generally parallel relationship.

13. A vehicle seat, comprising:

a seat portion;

a backrest attached to the seat portion; and a storage apparatus attached to a rear portion of the backrest, comprising:

a pair of elongated support members adapted to be removably secured to a rear portion of the backrest in spaced-apart relationship; and first and second elongated storage compartments adapted to be removably secured to the elongated support members in adjacent, vertically spaced-apart relationship;

wherein each elongated storage compartment comprises a door pivotally mounted thereto for movement between a closed position for covering an opening in the respective storage compartment and an open position for allowing access to the respective storage compartment via the opening.

14. The vehicle seat of claim 13, wherein each elongated storage compartment comprises:

opposite upper and lower walls having a generally rectangular configuration;

opposite side walls having a generally rectangular configuration; and a rear wall having a generally rectangular configuration, and wherein each storage compartment is removably secured to the elongated support members via a respective rear wall.

15. The vehicle seat of claim 13, wherein the backrest includes a top portion and one or more headrests connected to the top portion via one or more respective support posts, and wherein each elongated support member comprises a hanger adapted to removably attach the support member to the one or more headrest support posts of a respective headrest.

16. The vehicle seat of claim 13, wherein the pair of elongated support members are adapted to be removably secured to a rear portion of the backrest in spaced-apart, generally parallel relationship.

* * * * *